Sept. 28, 1971   B. M. FABUSS ET AL   3,608,273
APPARATUS AND PROCESS FOR DESORPTION OF FILTER
BEDS BY ELECTRIC CURRENT
Filed Jan. 15, 1969
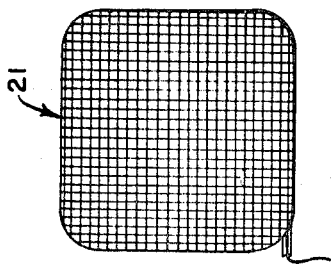
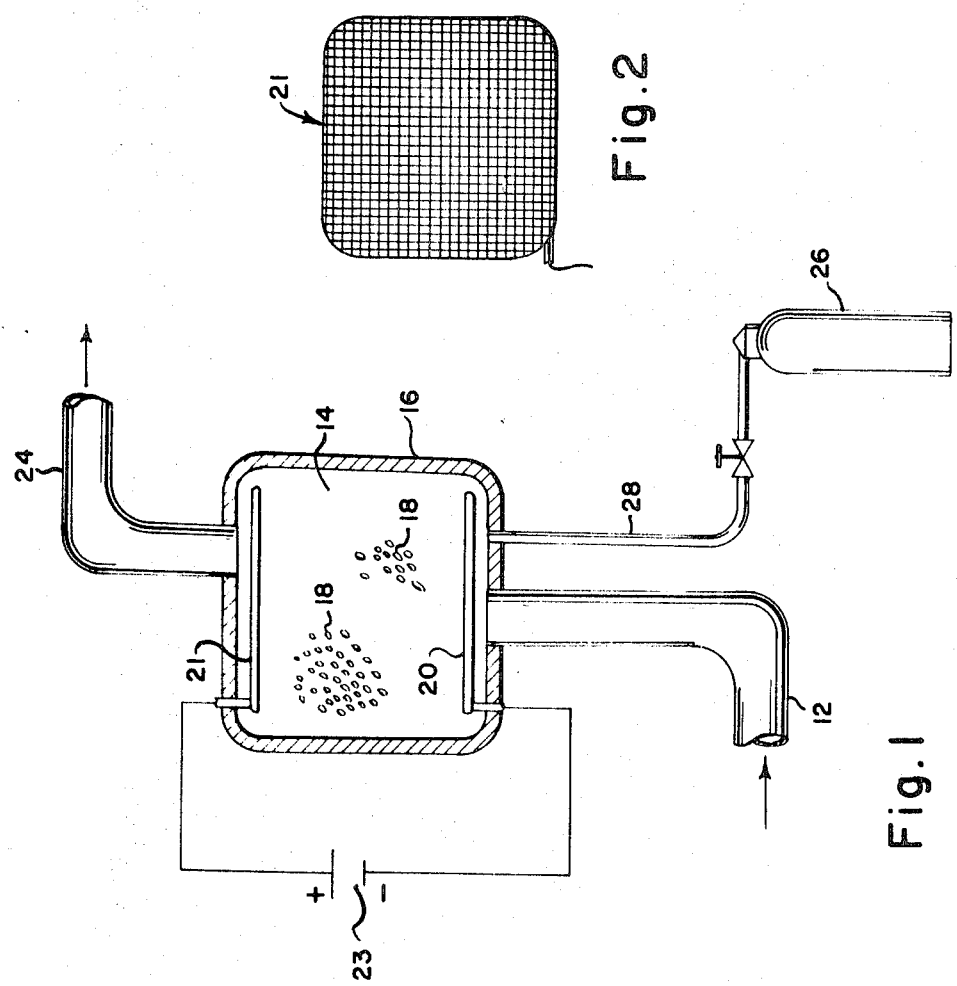
INVENTORS
Bela M. Fabuss
Wilson C. Dubois
BY
Pearson + Pearson
ATTORNEYS

United States Patent Office 3,608,273
Patented Sept. 28, 1971

3,608,273
APPARATUS AND PROCESS FOR DESORPTION OF FILTER BEDS BY ELECTRIC CURRENT
Bela M. Fabuss, Winchester, and Wilson C. Du Bois, Tyngsboro, Mass., assignors to Lowell Technological Institute Research Foundation, Lowell, Mass.
Filed Jan. 15, 1969, Ser. No. 791,339
Int. Cl. B01d 53/02
U.S. Cl. 55—74         7 Claims

ABSTRACT OF THE DISCLOSURE

Apparatus for use in adsorption of contaminants from fluid streams, said apparatus comprising a particulate adsorbent which is sufficiently conductive to be susceptible to direct heating by an electrical resistance heating means for periodically heating the contaminant-laden adsorbent to a temperature effective to free it of the contaminants and thereby prepare it for further use without need of removing it from said apparatus.

BACKGROUND OF THE INVENTION

Pollution of various industrial fluid streams has been a growing problem for a number of years until, at the present time, control of such pollution has become a major cost factor in estimating the capital required for many new industrial plants and in estimating the cost of continuing the operation of old industrial plants while keeping emission of pollutants to a level which is in compliance with increasingly strict Federal, State, and Municipal regulations. In general, apparatus useful in pollution control should be of minimum initial cost, operable at minimum cost, and should provide means for the economic recovery of an optimum quantity of by-products when such by-products are present in the fluid stream being treated.

Among the more important fluid-stream purification means has been the porous bed filter formed of adsorbent materials such as charcoal, silica and alumina. Such adsorbents must be characterized by low resistance to fluid passage therethrough, and resistance to deterioration during use and regeneration. Silica and alumina are relatively expensive, but in most applications they show less deterioration than activated charcoal and other particulate carbon forms, because carbon is susceptible to oxidation at the higher temperatures sometimes necessary for the regeneration of the adsorbent. This regeneration usually takes the form of purging the adsorbent bed with a clean gas stream which is hot enough to heat the adsorbent to the regeneration temperatures at which the contaminant is released from the adsorbent making it acceptable for further use. In other applications the adsorbent is heated by electrical means, using indirect heat transfer from electrically heated resistance elements, or coils, or by high frequency dielectric heating. The latter method can only be used for non-conductive adsorbents. A number of new applications would be served by an improved regeneration process which can use direct heat transfer to electrically conductive, or partially conductive, adsorbent. In most applications, a large amount of an oxidizing gas (like oxygen in air) is present during the regeneration step and this presence limits the general use of carbon-type adsorbents. On a purely economic and performance basis, the carbon-type adsorbents would be preferred in many applications were there a way to regenerate them without excessive oxidation. Moreover, a number of new applications would be served by such an improved regeneration process for which new applications there are no present economic and satisfactory stream-cleaning methods available.

SUMMARY OF THE INVENTION

Therefore, it is an object of the present invention to provide a novel and improved process and apparatus with which contaminants can be removed from gas streams.

Another object of the invention is to provide an apparatus wherein conductive adsorbents with relatively high resistivities, can be conveniently regenerated.

Another object of the invention is to provide a means for regenerating such conductive adsorbents with a minimum of decomposition due to oxidation or other chemical attack.

Other objects of the invention will be obvious to those skilled in the art on reading the instant specification.

The above objects have been substantially achieved by constructing an apparatus for adsorbing impurities comprising an enclosed compartment having a fluid inlet thereto and a fluid outlet therefrom; an electrically conductive particulate adsorbent in the compartment which can be efficiently heated by electrical resistance heating of the type achieved by the direct application of electrical current thereacross.

This apparatus allows direct heating of the particulate material so that high volumes of hot regenerating or purge gases are not required during the regeneration cycle. Other advantages are that the system may be arranged for regenerating the charge at any practicable temperature independent of any regenerating gas supply; the system may be heated, utilized and regenerated within a short time cycle; and the system is compact and highly versatile. It is in fact suitable for incorporation into portable systems, including laboratory apparatus.

Far preferred for all but the most special applications, however, are materials having resistivities about 20 to 50 ohms per centimeter and of these porous forms of carbon, e.g. activated carbon, have much the more versatile properties.

The most economical, most easily controlled, and most versatile electrical heating means for most applications is a conventional source of electrical current, for example A.C. or D.C. current, being directed through a circuit into which circuit the conductive adsorbent is incorporated. Using this latter procedure, a rheostat or some other such device is easily utilized to control, over a very wide range, the rate of heating and ultimate temperature reached during heating.

It is often desirable to provide a source of non-oxidizing (unless, perchance, some special advantage is to be achieved by use of an oxidizing gas) purge gas to be passed through the bed of particulate adsorbent when it has been heated to the regenerating temperature. In this way, a relatively small amount of fluid is used to facilitate the removal of contaminants from the adsorbent charge.

A particular advantage of this invention is that a single charge of adsorbent can be effective for a great number of adsorption-desorption cycles.

Illustrative separations possible with such apparatus include removal of organic vapors, such as benzene, or sulfur dioxide from an air stream, and removal of organic contaminants from a water stream, such as acetone and phenol, and the like.

It is pointed out that the conductive particulate adsorbent may comprise less than 100% of the total particulate adsorbent used. However, there must be sufficient conductive adsorbent to allow point-to-point contact between conductive particles and thereby allow an effective electric current across the bed of particles. In such a situation, the heat imparted to the conductive adsorbent can be partially transferred to any non-conductive adsorbent which is present (for example, silica or alumina). It is usually desirable to limit use of the non-conductive adsorbent to less than about 60 volume percent of the total adsorbent charge. However, such non-conductive adsorbents often have a particular affinity for some contaminant that cannot be matched by known conductive adsorbents, so their use with the apparatus of the invention should not be ignored.

ILLUSTRATIVE EMBODIMENT OF THE INVENTION

FIG. 1 is a diagrammatic sketch of an apparatus according to the instant invention.

FIG. 2 shows a metallic grid useful as a terminal in the apparatus of the instant invention.

Referring to FIG. 1, it is seen that a stack gas containing an undesirable pollutant, say a hydrocarbon-bearing gas, is carried from a reactor (not shown) into conduit 12 and transported therethrough into compartment 14 of tank 16. Compartment 14 contains a charge of particulate activated carbon 18 and two wire mesh electrical terminals 20 and 21, which are mounted at opposite sides of compartment 14. Terminals 20 and 21 are in turn connected to a variable source of voltage 23.

A fluid outlet conduit 24 provides means for gas to escape from tank 16. A small tank 26 of purge gas is provided and a conduit 28 is provided for supplying this gas into tank 16 at a point remote from outlet conduit 24.

In a typical operation, the aforesaid hydrocarbon containing gas will be allowed to flow through the adsorbent until the rate of contaminant adsorption becomes unfavorable, thereupon the flow is either stopped or shunted to a second compartment in parallel with the first. A voltage of 110 volts is applied over a typical bed 12 inches thick and about 15 inches in diameter and comprised of an activated carbon sold under the trade designation Filtrasorb 300 (manufactured by Calgon Company). Thereupon, the temperature is raised to 360° F. in about 5 minutes and allowed to stay at the elevated temperature for 30 minutes before being cooled. This cycle has been found to be suitable for the desorption of benzene which was adsorbed from an air stream.

We claim:
1. Apparatus for separating impurities from a fluid stream comprising:
   (1) an enclosed compartment having a fluid inlet thereto and fluid outlet therefrom;
   (2) a charge of particulate adsorbent therein, said adsorbent being characterized by its electric conductivity and susceptibility to electrical resistance heating; and
   (3) electrical resistance heating means operably related to the said adsorbent whereby the heating of the adsorbent to a temperature at which material adsorbed on the particles is desorbed from the particles is accomplished by passing electric current directly across the adsorbent.

2. Apparatus as defined in claim 1, wherein said electrically conductive particulate material is carbon.

3. Apparatus as defined in claim 1, wherein said electrical resistance heating means comprises:
   (1) two terminals, each mounted on an opposite side of said compartment, each such terminal being of sufficient size to cover a major portion of the surface of the charge of said electrically conductive particulate adsorbent, and
   (2) a source of electrical current operably connected to said terminals and said charge to effect the heating thereof by electrical resistance.

4. Apparatus as defined in claim 3 wherein each said terminal is a wire mesh, metallic grid.

5. A process for removing contaminants from a fluid stream, comprising the steps of
   (1) passing said stream through a mass of electrically conductive particulate adsorbent;
   (2) thereafter passing an electrical current through said adsorbent to heat the adsorbent by electrical resistance heating and thereby drive any volatile contaminant from said adsorbent, and
   (3) resuming the passing of said stream through the particulate adsorbent until desorption is again required.

6. The process of claim 5 wherein said particulate adsorbent contains up to about 60% by volume of a substantially non-conductive adsorbent.

7. Apparatus for separating impurities from a fluid stream comprising:
   a mass of electrically conductive, particulate, adsorbent, filter medium interposed in said fluid stream to adsorb impurities therefrom;
   a pair of electrically conductive terminal elements, each on an opposite side of said mass, and substantially coextensive in area with the area of cross-section of said filter medium, for assuring complete introduction of all of said medium in an electric heating circuit; and
   an electrical resistance heating circuit, including a source of current, said elements and said conductive filter medium, for heating said material to a temperature sufficient to desorb said impurities from said filter medium.

References Cited

UNITED STATES PATENTS

| | | | |
|---|---|---|---|
| 2,083,732 | 6/1937 | Moore et al. | 55—62X |
| 3,225,516 | 12/1965 | Smith et al. | 55—62X |
| 3,359,707 | 12/1967 | Jean | 55—179X |

REUBEN FRIEDMAN, Primary Examiner

R. W. BURKS, Assistant Examiner

U.S. Cl. X.R.

55—208